US006891702B1

(12) United States Patent
Tang (10) Patent No.: US 6,891,702 B1
(45) Date of Patent: May 10, 2005

(54) METHOD AND DEVICES FOR PROVIDING MAGNETORESISTIVE HEADS WITH PROTECTION FROM ELECTROSTATIC DISCHARGE AND ELECTRIC OVERSTRESS EVENTS

(75) Inventor: Kathy X. Tang, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 173 days.

(21) Appl. No.: 10/286,144

(22) Filed: Oct. 31, 2002

(51) Int. Cl.[7] .................................................. G11B 5/33
(52) U.S. Cl. ........................................................ 360/323
(58) Field of Search ............................... 360/128, 323; 257/40, 355; 330/253

(56) References Cited

U.S. PATENT DOCUMENTS

| 5,525,811 | A | * | 6/1996 | Sakurai et al. ................. 257/40 |
| 5,587,857 | A | | 12/1996 | Voldman et al. |
| 5,644,454 | A | | 7/1997 | Arya et al. |
| 5,757,590 | A | | 5/1998 | Phipps et al. |
| 5,771,571 | A | | 6/1998 | Voldman et al. |
| 6,121,838 | A | * | 9/2000 | Freeman et al. ............. 330/253 |
| 6,163,437 | A | * | 12/2000 | Inage et al. .................. 360/128 |
| 6,377,411 | B1 | | 4/2002 | Katsumata et al. ........... 360/46 |
| 6,400,534 | B1 | | 6/2002 | Klaassen |
| 6,424,505 | B1 | | 7/2002 | Lam et al. |
| 6,507,466 | B1 | * | 1/2003 | Hayashi et al. .............. 360/323 |
| 6,574,078 | B1 | * | 6/2003 | Voldman ..................... 360/323 |
| 6,674,129 | B1 | * | 1/2004 | Colclaser et al. ............ 257/355 |
| 6,687,097 | B1 | * | 2/2004 | Anderson et al. ........... 360/323 |
| 6,704,173 | B1 | * | 3/2004 | Lam et al. ................... 360/323 |
| 2003/0210501 | A1 | * | 11/2003 | Voldman ..................... 360/323 |

* cited by examiner

Primary Examiner—Tianjie Chen
(74) Attorney, Agent, or Firm—Won Tae C. Kim, Esq.; Young Law Firm (57) ABSTRACT

A disk drive includes a disk having a recording surface, a head stack assembly that includes a body portion, an actuator arm cantilevered from the body portion and a head gimbal assembly supported at the actuator arm. The head gimbal assembly includes a suspension having a first end and a second end, the first end being attached to the actuator arm, a slider coupled to the second end of the suspension, the slider comprising a transducer for reading from and writing to the recording surface. A gimbal is coupled to the second end of the suspension and to the slider. An array of diodes is attached to the suspension to protect the transducer from electrostatic discharge or electrical overstress events.

60 Claims, 4 Drawing Sheets

METHOD AND DEVICES FOR PROVIDING MAGNETORESISTIVE HEADS WITH PROTECTION FROM ELECTROSTATIC DISCHARGE AND ELECTRIC OVERSTRESS EVENTS

BACKGROUND OF THE INVENTION

1. Field of the Invention

This invention relates to methods and systems for protecting magnetoresistive (MR) disk drive heads from electrostatic discharge (ESD) and electric overstress (EOS) events.

2. Description of the Prior Art and Related Information

Magnetic disk drives, such as those used for mass storage in personal computer systems are well known. Generally, disk drives include a head disk assembly (HDA) and a controller printed circuit board (PCBA). The HDA includes a cover, a base, one or more disks, a head stack assembly (HSA) that includes an actuator assembly, head gimbal assembly (HGA) and a flex circuit. The HSA rotatably positions a head having one or more transducers over a disk. A spindle motor spins the disks.

In older inductive heads, a single transducer performs both the reading and the writing functions. In the currently industry-favored magnetoresistive heads, the slider supports separate read and write transducers. MR heads enable higher densities because of their higher sensitivities to magnetic flux. Due to their relatively small physical dimensions, however, MR heads are particularly sensitive to ESD and EOS events. The fundamental mechanism of ESD is tribocharging, which may occur when different materials come in contact with one another and then separate, such as the sole of a person's shoe walking across a carpet, or when an IC or other sensitive element (such as an MR head) slides against or comes in contact with a metal component of an automatic manufacturing equipment. The magnitude of the generated charge is dependent upon many factors including, for example, the type of materials, the speed with the different materials slide together as well as the relative humidity of the environment in which the contact occurred.

It is to be expected that as recording densities increase and MR heads are further reduced in size, they will become even more sensitive and susceptible to damage from ESD and/or EOS events. Moreover, there are many occasions during the disk drive manufacturing process in which MR heads may become damaged. These include during the HGA, HSA and HDA manufacturing processes, in addition to damage during in-drive operation. Protecting MR heads at all stages of the disk drive manufacturing process becomes critical for maintaining high head yields, drive yields and head and drive reliability.

From the foregoing, it may be appreciated that there is a clear need for protecting the MR heads of a disk drive, at all stages of manufacture of the constituent assemblies thereof and during operation of the drive itself.

Conventional attempts to protect the heads from electrostatic discharges and electric overstress events included factory ESD precautions, resistive shunting and placing diodes in the drive's preamplifier. The increasing sensitivities of ever shrinking MR heads are quickly rendering even the most careful ESD precautions ineffective and damage to MR heads are lowering yields and causing reliability issues. Resistive shunting ESD/EOS protection schemes range from permanent shorting to adjustable shorting. Permanent shorting is effective, as it shorts out the MR heads until the short is removed. U.S. Pat. Nos. 6,400,534 and 6,424,505 are examples of such permanent shorting schemes. However, using this technique, deshunting is necessary before the HGA and HSA can be tested, after which the heads must be re-shorted. However, it may be appreciated that the very act of deshunting and reshunting the heads may itself result additional ESD events. Adjustable shunting and deshunting schemes are disclosed in U.S. Pat. Nos. 5,644,454, and 5,757,590 and require dedicated mechanisms and control circuitry to actively shunt and deshunt. Placing diodes in the preamplifier may protect the HSA after it is built, but does not provide any protection for the heads during the HGA and HSA fabrication processes. Moreover, placing diodes in the preamp is wholly ineffective to protect the heads before the preamplifier is connected to the HSA. In addition, the distance between the preamp and the heads is believed to be too great to provide effective ESD protection, as electrostatic discharges may damage the heads even before reaching the diodes.

What is needed, therefore, is effective ESD and EOS protection for the heads of a disk drive at all stages of the construction thereof. What is also needed is ESD/EOS protection that does not require deshunting prior to testing or use of the drive.

SUMMARY OF THE INVENTION

According to one aspect thereof, this invention can be regarded as a head stack assembly for a disk drive, the head stack assembly comprising a body portion including a bore defining a pivot axis; an actuator arm cantilevered from the body portion; a head gimbal assembly supported at the actuator arm and including: a suspension having a first end and a second end, the first end being attached to the actuator arm and a slider coupled to the second end of the suspension, the slider comprising a transducer. An array of diodes is attached to the suspension and is configured to protect the transducer from electrostatic discharge or electrical overstress events, and a gimbal coupled to the second end of the suspension and to the slider.

The array of diodes may be coupled across the transducer to shunt electrostatic discharges and over current away from the transducer. The array of diodes may be configured to shunt electrostatic discharges and over voltages to a voltage potential of the suspension and away from the transducer. The array of diodes may be configured to shunt electrostatic discharges and over voltages across the transducer to a voltage potential of the suspension. The array of diodes may be attached near the first end of the suspension, attached to the suspension near the slider, or between the first and second ends of the suspension. Preferably, the array of diodes is attached to the suspension at a location that minimizes changes to the resonance characteristics of the head gimbal assembly. The array of diodes may include a diode comprising a Schottky metal barrier and/or a Schottky diode-connected transistor. The array of diodes may include a GaAs MESFET. Constituent diodes of the array of diodes may have a turn-on voltage that is just above the turn-on voltage of the transducer. Constituent diodes of the array of diodes have a turn-on voltage that is just above the operating voltage of the transducer and below a turn-on voltage of silicon diodes. The turn-on voltage of the constituent diodes of the array of diodes may be about, for example, 220 mV to about 350 mV. The array of diodes may be configured to allow no more than about 6 mA to flow through the transducer. The array of diodes may be configured to allow no more than about 300 mV from the transducer to the suspension.

The present invention is also a suspension assembly for attachment to an actuator arm in a disk drive and for supporting a slider, the suspension assembly comprising a suspension, the suspension having a first end and a second end, the first end being configured to attach to the actuator arm and the second end being configured to support the slider, which includes a transducer. An array of diodes is attached to the suspension and is configured to protect the transducer from electrostatic discharge or electrical overstress events.

The array of diodes may be coupled across the transducer to shunt electrostatic discharges and over currents away from the transducer. The array of diodes may be configured to shunt electrostatic discharges and over voltages to the voltage potential of the suspension and away from the transducer. The array of diodes may be configured to shunt electrostatic discharges and over voltages across the transducer to the voltage potential of the suspension. The array of diodes may be attached near the first end of the suspension, near the slider or between the first and second ends of the suspension. Preferably, the array of diodes is attached to the suspension at a location that minimizes changes to the resonance characteristics of the head gimbal assembly. The array of diodes may include a diode comprising a Schottky metal barrier and/or a Schottky diode-connected transistor. For example, the array of diodes may include a GaAs MESFET. Constituent diodes of the array of diodes may have a turn-on voltage that is just above the turn-on voltage of the transducer. Constituent diodes of the array of diodes have a turn-on voltage that is just above the turn on voltage of the transducer and that is below the turn-on voltage of silicon diodes (which is about 700 mV). For example, the turn-n voltage of the constituent diodes of the array of diodes may be about 220 mV to about 350 mV. For example, the array of diodes may be configured to allow no more than about 6 mA to flow through the transducer (assuming a 50 ohm head). The array of diodes may be configured to allow no more than about 300 mV from the transducer to the suspension (or ground).

The present invention may also be viewed as a head gimbal assembly for attachment to an actuator arm in a disk drive, the head gimbal assembly comprising: a suspension having a first end and a second end, the first end being attached to the actuator arm; a slider coupled to the second end of the suspension, which slider includes a transducer. An array of diodes, attached to the suspension, is configured to protect the transducer from electrostatic discharge or electrical overstress events. A gimbal is coupled to the second end of the suspension and to the slider.

The array of diodes may be coupled across the transducer to shunt electrostatic discharges and over currents away from the transducer. The array of diodes may be configured to shunt electrostatic discharges and over voltages to the voltage potential of the suspension and away from the transducer. The array of diodes may be configured to shunt electrostatic discharges and over voltages across the transducer to the voltage potential of the suspension (such as ground, for example). The array of diodes may be attached near the first end of the suspension, near the slider or between the first and second ends of the suspension. The array of diodes may be attached to the suspension at a location that minimizes changes to the resonance characteristics of the head gimbal assembly. The array of diodes may include a diode comprising a Schottky metal barrier and/or a Schottky diode-connected transistor. For example, the array of diodes may include a GaAs (for example) MESFET. Constituent diodes of the array of diodes may have a turn-on voltage that is just above the turn-on voltage of the transducer. Constituent diodes of the array of diodes may have a turn-on voltage that is just above the turn on voltage of the transducer and that is below the turn-on voltage of silicon diodes. For example, the turn-on voltage of the constituent diodes of the array of diodes may be about 220 mV to about 350 mV. The array of diodes may be configured to allow no more than about 6 mA to flow through the transducer. The array of diodes may be configured to allow no more than about 300 mV from the transducer to the suspension (ground).

The present invention, according to another embodiment thereof, is a disk drive, comprising: a disk having a recording surface; a head stack assembly, including: a body portion; an actuator arm cantilevered from the body portion, and a head gimbal assembly supported at the actuator arm and including: a suspension having a first end and a second end, the first end being attached to the actuator arm; a slider coupled to the second end of the suspension, the slider comprising a transducer for reading from and writing to the recording surface. An array of diodes, attached to the suspension, is configured to protect the transducer from electrostatic discharge or electrical overstress events. A gimbal is coupled to the second end of the suspension and to the slider.

The array of diodes may be coupled across the transducer to shunt electrostatic discharges and over currents away from the transducer. The array of diodes may be configured to shunt electrostatic discharges and over voltages to the voltage potential of the suspension and away from the transducer. The array of diodes may be configured to shunt electrostatic discharges and over voltages across the transducer to a voltage potential of the suspension. The array of diodes may be attached near the first end of the suspension, near the slider or between the first and second ends of the suspension. The array of diodes may be attached to the suspension at a location that minimizes changes to a resonance characteristics of the disk drive. The array of diodes may include a diode comprising a Schottky metal barrier and/or a Schottky diode-connected transistor. For example, the array of diodes may include a GaAs MESFET. Constituent diodes of the array of diodes have a turn-on voltage that may be just above the turn-on voltage of the transducer. Constituent diodes of the array of diodes may have a turn-on voltage that is just above the turn on voltage of the transducer and below a turn-on voltage of silicon diodes. For example, the turn-on voltage of the constituent diodes of the array of diodes may be about 220 mV to about 350 mV. The array of diodes may be configured to allow no more than about 6 mA to flow through the transducer, for example. The array of diodes may be configured to allow no more than about 300 mV from the transducer to the suspension (ground).

DESCRIPTION OF PREFERRED EMBODIMENTS

Figure 1:
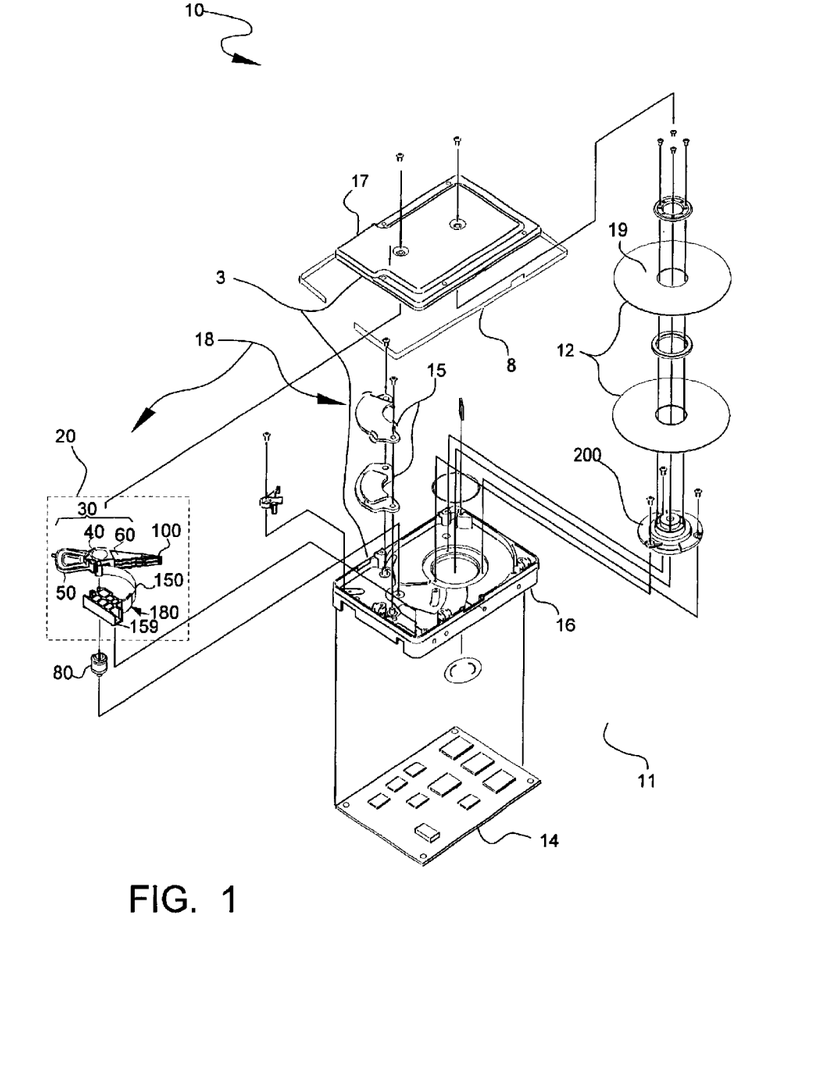
FIG. 1 is a diagram of the major components of a disk drive according to an embodiment of the present invention.

FIG. 1 shows the principal components of a magnetic disk drive 100 that incorporates aspects of the present invention. With reference to FIG. 1, the disk drive 100 comprises a HDA 144 and a PCBA 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). Each slider includes read and write transducers for reading from and writing to the recording surface(s) of the disks 111, 112. The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

Figure 2:
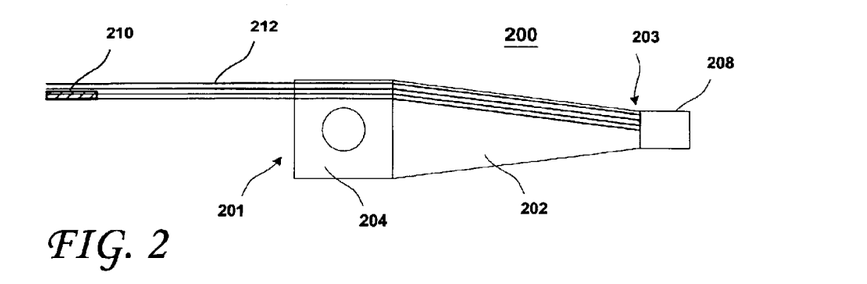
FIG. 2 is a representation of a head gimbal assembly according to an embodiment of the present invention.

FIG. 2 is a representation of a head gimbal assembly according to an embodiment of the present invention. As shown, the head gimbal assembly 200 includes a slider 208. According to an embodiment of the present invention, slider 208 includes MR read and write transducers. The head gimbal assembly 200 includes a suspension that includes a first end 201 that is configured to be attached to an actuator arm and a second end 203 to which the slider 208 attaches. The suspension includes a load beam 202 and a suspension boss 204. The actuator arm 160 of the HSA 120 attaches to the suspension at the suspension boss 204, in known fashion. The HGA 200 also includes a plurality of electrical traces 212 that are connected to the read and write transducers of the slider 208. For example, the electrical traces 212 may be incorporated in a Trace Suspension Assembly (TSA), in which the electrical traces are deposited between layers of an insulator, such as polyimid, and attached to the load beam 202, although the present invention is not limited to any particular structure of the electrical traces. The HGA 200 may also include a flexure or gimbal to which the slider 208 attaches, to enable the slider 208 to roll and pitch over the recording surface of the disk 111, 112. The flexure may include a portion of the TSA that extends away from the load beam 202 and supports the slider 208.

Figure 3:
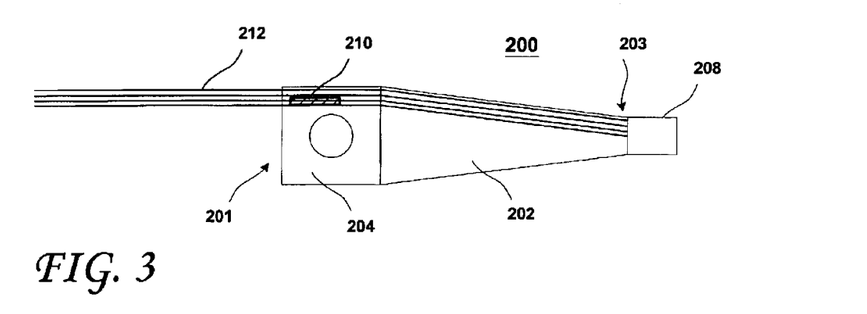
FIG. 3 is a representation of a head gimbal assembly according to another embodiment of the present invention.
Figure 4:
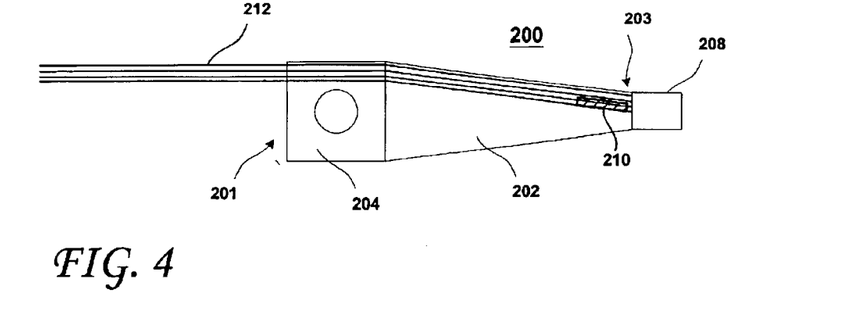
FIG. 4 is a representation of a head gimbal assembly according to still another embodiment of the present invention.

According to the present invention, to protect the transducer from electrostatic discharge or electrical overstress events, an array of diodes 210 is attached to the suspension. As shown in FIG. 2, the array of diodes 210 may be attached to the proximal-most portion of the load beam (i.e., closer to the actuator arm 160 than to the slider 208). Particularly, the array of diodes 210 may be attached to the traces 212 that are coupled to the read transducers of the slider 208 at a location that is close to the attachment point of the traces 212 to the flex cable 180, as shown in FIG. 2. Alternatively, the array of diodes 210 may be attached near the suspension boss 204, as shown in FIG. 3. Preferably, the array of diodes 210 is attached to the suspension at a location that minimizes changes to the mechanical resonance characteristics of the head gimbal assembly 200. Alternatively still, the array of diodes 210 may be attached near the slider 208 (i.e., closer to the slider 208 than to the actuator arm 160), as shown in FIG. 4. In any event, attaching the diode array 210 to the load beam (more particularly, to the traces 212 that are attached to the load beam 202) insures that the slider 208 is protected from over voltages and over currents during the manufacture, handling, shipping and incorporation thereof in the HGA 200, the HSA 120 and in the drive 100. This placement of the diode array 210 avoids the problems inherent in conventional devices, in which the ESD/EOS protection circuits are located in the drive's preamplifier and are incapable of protecting the slider 208 prior to its integration with the HSA 120 and connection thereof to the drive's preamplifier. Therefore, combining the placement of it the diode array 210 on the suspension and selecting diodes having low threshold voltages and rapid turn-on times insures that the MR head is protected from ESD/EOS events, before such events can thermally damage the heads.

According to the present invention, the array of diodes 210 may be coupled across the transducer of the slider 208 to shunt electrostatic discharges and over currents away from the transducer. Specifically, the array of diodes 210 may be coupled across the read transducer of the slider 208 to shunt electrostatic discharges away from the read transducers. Indeed, the array of diodes 210 is connected to the traces 212 that are electrically connected to the read transducer of the slider 208.

According to an embodiment of the present invention, the array of diodes 210 may be configured to shunt electrostatic discharges and over current away from the read transducer. The array of diodes 210 may also be configured to shunt electrostatic discharges and over voltages to a voltage potential of the suspension (i.e., to the voltage potential of the load beam) and away from the read transducer. In particular, the array of diodes may be advantageously configured to shunt electrostatic discharges and over voltages across the read transducer to a voltage potential of the suspension. The load beam 202 of the suspension may be coupled to the actuator arm 160 that, in turn, is connected to the base 116 of the disk drive 100. Preferably, the base 116 is at a reference potential, such as ground.

Preferably, the constituent diodes of the array of diodes 210 have a turn-on voltage that is just above the operating voltage of the transducer and that is below a turn-on voltage of silicon diodes (e.g., about 700 mV). If a MR head is used as the slider 208, the operating voltage (i.e., the voltage at which the MR head is operative to read information from the recording surface of the disk 111, 112) is about 150 mV. Therefore, the turn-on voltage of the constituent diodes of the array of diodes 210 may be selected to be above about 150 mV and to be lower than about 700 mV. For example, the turn-on voltage (threshold voltage, or voltage above which the diodes conduct current across the p-n junction thereof) of the constituent diodes of the array of diodes 210 may be about 220 mV to about 350 mV. The array of diodes may be configured to allow no more than about 4 to 6 mA (assuming that the MR transducer of the slider 208 is modeled as a 50 ohm resistance) to flow through the MR transducer of the slider 208 and no more than about 300 mV from the read transducers of the slider 208 to the suspension (which is typically at ground potential).

Figure 5A:
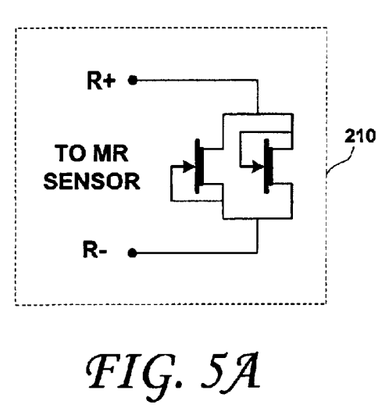
FIG. 5A is a circuit diagram of an array of diodes attached to the suspension to protect the transducer from electrostatic discharge or electrical overstress events, according to an embodiment of the present invention.
Figure 5B:
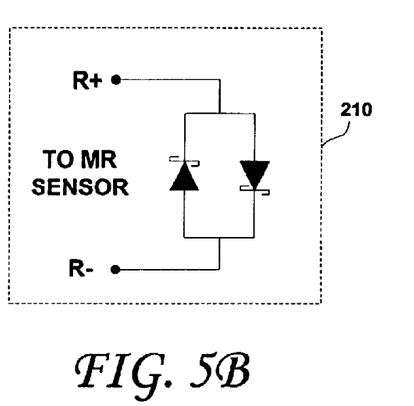
FIG. 5B is a circuit diagram of an array of diodes attached to the suspension to protect the transducer from electrostatic discharge or electrical overstress events, according to another embodiment of the present invention.

Suitable diodes for the array of diodes 210 for protecting the transducer from electrostatic discharge or electrical overstress events include diodes or transistors comprising a Schottky metal barrier. Indeed, Schottky-barrier diodes (SBD) may be used as the constituent diodes of the array 210. The Schottky-barrier diode includes a metal-semiconductor junction, in which the Schottky metal barrier forms the anode of the diode. FIG. 5B shows an embodiment of the diode array 210, in which the constituent diodes thereof are two cross-connected Schottky-barrier diodes whose terminals as coupled across the read transducers of the MR head. The Schottky barrier diodes may be formed from a GaAs process, for example. As shown in FIG. 5A, the diodes may alternatively be formed from metal semiconductor field effect transistors (MESFET). By connecting its gate and source terminals together, a MESFET effectively has the v-i characteristics of a Schottky-barrier diode. The constituent MESFETs forming the diodes of the array of diodes 210 may be formed by a GaAs (for example) process, and are preferably n-channel MESFETs. According to an embodiment of the present invention, the constituent diodes of the array 210 are formed of n-channel enhancement-mode MESFETs, which are normally off. To turn on such devices, a positive gate voltage must be applied to reduce the thickness of the depletion region below that of the channel region. Depending on the process used, this positive gate voltage may be between about 100 mV to about 300 mV. The MESFET transistors shown in FIG. 5A each have their respective gates tied to their drain, and the two MESFETs are cross-connected, such that their respective sources and drains are coupled to one-another.

In either FIGS. 5A and 5B, should an over voltage occur across the MR head that is sufficient to turn on one of the two constituent diodes or diode-connected transistors of the array 210, the potential across the head will be brought to ground, i.e., to the voltage potential of the suspension, HSA 120 and base 116. Over currents will also be shunted away from the MR head, thereby protecting the MR head from the thermally induced damage (i.e., rendered inoperative, amplitude degraded or unstable) usually associated with ESD and/or EOS events. Preferably, the constituent diodes or transistors of the array 210 are chosen such that the leakage current therethrough is acceptable and the diode-noise associated with the p-n junctions thereof is minimal and does not detrimentally affect the operation of the slider 208 and the transmission of the read signal from the slider 208 to the drive's preamplifier.

Figure 6:
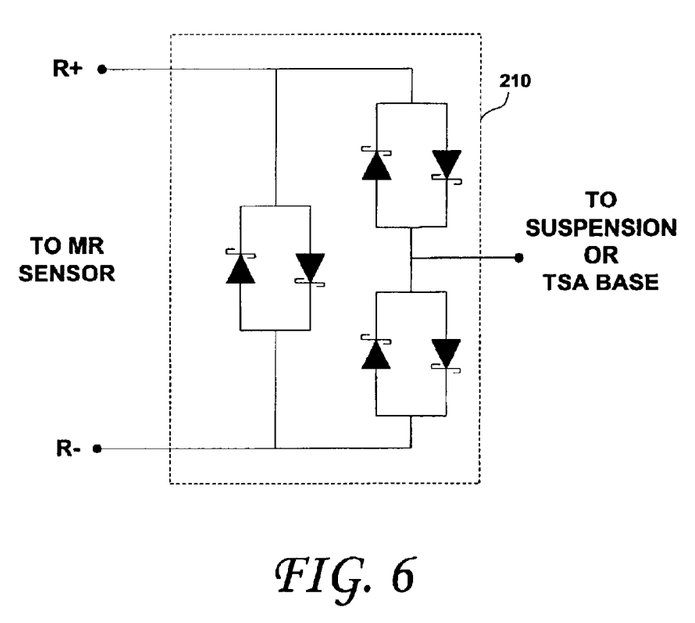
FIG. 6 is a circuit diagram of an array of diodes attached to the suspension to protect the transducer from electrostatic discharge or electrical overstress events, according to a still further embodiment of the present invention.

FIG. 6 shows an embodiment of the array 210 of diodes that shunts electrostatic discharges and over voltages away from the MR head to the voltage potential of the suspension (e.g., the voltage potential of the load beam—such as ground). The diode array 210 may include a pair of cross-connected diodes (or diode-connected MESFETs) coupled across the read traces R+ and R− that are coupled to the MR sensor and that carry the read signals from the MR head or slider 208 to the drive's preamplifier. Another pair of cross-connected Schottky-barrier diodes or MESFETs is coupled between the suspension and the R− trace and a further pair of cross-connected Schottky-barrier diodes or MESFETs is coupled between the suspension and the R+ trace. In this manner, irrespective of the polarity of the ESD/EOS event, undesirable over voltages will be shunted to the potential of the suspension (preferably the ground potential), as at least one of the diodes or diode-connected MESFETs will conduct and shunt over currents to ground when the potential across its terminals exceeds the device's threshold voltage. Preferably, the diodes or MESFETs of the array 210 have a short turn on time, to minimize damage to the MR sensor. When the Charged Device Model (CDM) is used to model ESD/EOS events across the MR head, the turn on time of the diodes should be about 2 ns and should be about 100 ns when the Human Body Model (HBM) is used.

Figure 7:
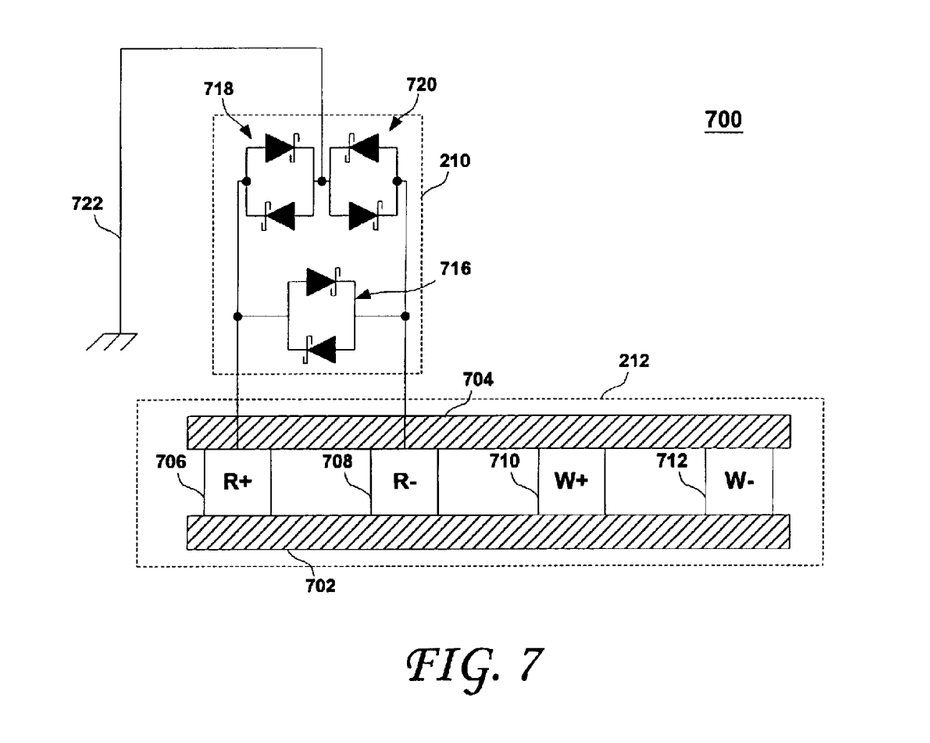
FIG. 7 is a representation of an array of diodes coupled to the conductive traces of a trace suspension assembly of a disk drive according to an embodiment of the present invention.

FIG. 7 is a representation of an array of diodes coupled to the traces 212 that are coupled to the read transducers of the slider 208 of a disk drive according to an embodiment of the present invention. FIG. 7 shows, in cross-section, the electrical traces 212 that are coupled to the read and write transducers of the slider 208 and that run the length of the load beam for attachment to the flex cable 180 by means of solder bumps or adhesive conductive strips, for example. The traces 212 may be sandwiched between layers of an insulator such as polyimid layers 702, 704, forming a TSA that is attached to the load beam 202 of the suspension assembly. Trace 706 is coupled to a first read R+ transducer terminal, trace 708 is coupled to a second read R−transducer terminal, trace 710 is coupled to a first write W+ transducer terminal and trace 712 is coupled to a second write W− transducer terminal. Coupled to the traces 706, 708 is a pair 716 of cross-connected Schottky-barrier diodes. Alternatively, a pair of cross- and diode-connected Schottky barrier transistors such as MESFETs may be used. These clamp any over voltage developed across the traces 706, 708 to the clamping or threshold voltage of the pair of diodes 716. To insure that electrostatic discharges and over voltages across the traces 706, 708 are shunted to the voltage potential of the suspension (preferably ground), the diode array 210 may include two additional pairs of cross-connected diodes 718, 720. The pair of cross-connected diodes 718 is coupled between the suspension (ground) and the trace 706, and the pair of cross-connected diodes 720 is connected between the suspension (ground) and trace 708. As before, transistors including a Schottky metal barrier (such as MESFETs, for example) may be used instead of diodes.

According to an embodiment of the present invention, the diode array 210 may be embodied in a so-called "flip chip", in which the die containing the circuitry is attached to the package carrier. The interconnection between the die and carrier in flip chip packaging is made through a conductive bump that is placed directly on the die surface. The bumped die is then "flipped over" and placed face down, with the bumps connecting to the carrier directly. Such packaging is lightweight and does not substantially affect the mechanical characteristics (e.g., resonance) characteristics of the suspension. Alternatively, the diode array 210 may be formed using a process that is similar to that used to deposit the traces 212 and formed directly on a layer of polyimide or similar substrate.

Advantageously, the present invention provides ESD/EOS protection for the heads, even before the HGA is coupled to the actuator arm 160 and to the drive's preamplifier. The present invention may provide effective protection to the heads, even as the dimensions of MR heads continue to shrink and their susceptibility to the thermal damage incident to ESD and/or EOS events increases.

I claim:

1. A head stack assembly for a disk drive, the head stack assembly comprising:
    a body portion including a bore defining a pivot axis;
    an actuator arm cantilevered from the body portion;
    a head gimbal assembly supported at the actuator arm and including:
    a suspension having a first end and a second end, the first end being attached to the actuator arm;
    a slider coupled to the second end of the suspension, the slider comprising a transducer and
    an array of diodes attached to the suspension, configured to protect the transducer from electrostatic discharge or electrical overstress events and to allow no more than about 6 mA to flow through the transducer; and
    a gimbal coupled to the second end of the suspension and to the slider.

2. The head stack assembly of claim 1, wherein the array of diodes is coupled across the transducer to shunt electrostatic discharges and over current away from the transducer.

3. The head stack assembly of claim 1, wherein the array of diodes is configured to shunt electrostatic discharges and over voltages to a voltage potential of the suspension and away from the transducer.

4. The head assembly of claim 1, wherein the array of diodes is configured to shunt electrostatic discharges and over voltages across the transducer to a voltage potential of the suspension.

5. The head stack assembly of claim 1, wherein the array of diodes is attached near the first end of the suspension.

6. The head stack assembly of claim 1, wherein the array of diodes is attached to the suspension near the slider.

7. The head stack assembly of claim 1, wherein the array of diodes is attached between the first and second ends of the suspension.

8. The head stack assembly of claim 1, wherein the array of diodes is attached to the suspension at a location that minimizes changes to a resonance characteristic of the head gimbal assembly.

9. The head stack assembly of claim 1, wherein the array of diodes includes a diode comprising a Schottky metal barrier.

10. The head stack assembly of claim 1, wherein the array of diodes includes a Schottky diode-connected transistor.

11. The head stack assembly of claim 1, wherein the array of diodes includes a GaAs MESFET.

12. The head stack assembly of claim 1, wherein constituent diodes of the array of diodes have a turn-on voltage that is just above a turn-on voltage of the transducer.

13. The head stack assembly of claim 12, wherein constituent diodes of the array of diodes have a turn-on voltage that is just above the operating voltage of the transducer and that is below a turn-on voltage of silicon diodes.

14. The head stack assembly of claim 12, wherein the turn-on voltage of the constituent diodes of the array of diodes is about 220 mV to about 350 mV.

15. The head stack assembly of claim 1, wherein the array of diodes is configured to allow no more than about 300 mV from the transducer to the suspension.

16. A suspension assembly for attachment to an actuator arm in a disk drive and for supporting a slider, the suspension assembly comprising:
    a suspension, the suspension having a first end and a second end, the first end being configured to attach to the actuator arm and the second end being configured to support the slider, the slider comprising a transducer and
    an array of diodes configured to protect the transducer from electrostatic discharge or electrical overstress events and to allow no more than about 6 mA to flow through the transducer, the array being attached to the suspension.

17. The suspension assembly of claim 16, wherein the array of diodes is coupled across the transducer to shunt electrostatic discharges and over currents away from the transducer.

18. The suspension assembly of claim 16, wherein the array of diodes is configured to shunt electrostatic discharges and over voltages to a voltage potential of the suspension and away from the transducer.

19. The suspension assembly of claim 16, wherein the array of diodes is configured to shunt electrostatic discharges and over voltages across the transducer to a voltage potential of the suspension.

20. The suspension assembly of claim 16, wherein the array of diodes is attached near the first end of the suspension.

21. The suspension assembly of claim 16, wherein the array of diodes is attached to the suspension near the slider.

22. The suspension assembly of claim 16, wherein the array of diodes is attached between the first and second ends of the suspension.

23. The suspension assembly of claim 16, wherein the array of diodes is attached to the suspension at a location that minimizes changes to a resonance characteristic of the head gimbal assembly.

24. The suspension assembly of claim 16, wherein the array of diodes includes a diode comprising a Schottky metal barrier.

25. The suspension assembly of claim 16, wherein the army of diodes includes a Schottky diode-connected transistor.

26. The suspension assembly of claim 16, wherein the array of diodes includes a GaAs MESFET.

27. The suspension assembly of claim 16, wherein constituent diodes of the array of diodes have a turn-on voltage that is just above a turn-on voltage of the transducer.

28. The suspension assembly of claim 27, rein constituent diode of the array of diodes have a turn-on voltage that is just above the turn on voltage of the transducer and that is below a turn-on voltage of silicon diodes.

29. The suspension assembly of claim 27, wherein the turn-on voltage of the constituent diodes of the array of diodes is about 220 mV to about 350 mV.

30. The suspension assembly of claim 16, wherein the array of diodes is configured to allow no more than about 300 mV from the transducer to the suspension.

31. A head gimbal assembly for attachment to an actuator arm in a disk drive, the head gimbal assembly comprising:
a suspension having a first end and a second end, the first end being attached to the actuator arm;
a slider coupled to the second end of the suspension, the slider comprising a transducer and
an array of diodes, attached to the suspension, configured to protect the transducer from electrostatic discharge or electrical overstress events and to allow no more than about 6 mA to flow through the transducer, and
a gimbal coupled to the second end of the suspension and to the slider.

32. The head gimbal assembly of claim 31, wherein the array of diodes is coupled across the transducer to shunt electrostatic discharges and over currents away from the transducer.

33. The head gimbal assembly of claim 31, wherein the array of diodes is configured to shunt electrostatic discharges and over voltages to a voltage potential of the suspension and away from the transducer.

34. The head gimbal assembly of claim 31, wherein the array of diodes is configured to shunt electrostatic discharges and over voltages across the transducer to a voltage potential of the suspension.

35. The head gimbal assembly of claim 31, wherein the array of diodes is attached near the fit end of the suspension.

36. The head gimbal assembly of claim 31, wherein the army of diodes is attached to the suspension near the slider.

37. The head gimbal assembly of claim 31, wherein the array of diodes is attached between the first and second ends of the suspension.

38. The head gimbal assembly of claim 31, wherein the array of diodes is attached to the suspension at a location that minimizes changes to a resonance characteristic of the head gimbal assembly.

39. The head gimbal assembly of claim 31, wherein the array of diodes includes a diode comprising a Schottky metal barrier.

40. The head gimbal assembly of claim 31, wherein the array of diodes includes a Schottky diode-connected transistor.

41. The head gimbal assembly of claim 31, wherein the array of diodes includes a GaAs MESFET.

42. The head gimbal assembly of claim 31, wherein constituent diodes of the array of diodes have a turn-on voltage that is just above a turn on voltage of the transducer.

43. The head gimbal assembly of claim 42, wherein constituent diodes of the array of diodes have a turn-on voltage that is just above the turn on voltage of the transducer and that is below a turn-on voltage of silicon diodes.

44. The bead gimbal assembly of claim 42, wherein the turn-on voltage of the constituent diodes of the array of diodes is about 220 mV to about 350 mV.

45. The head gimbal assembly of claim 31, wherein the array of diodes is configured to allow no more to about 300 mV from the transducer to the suspension.

46. A disk drive, comprising:
a disk having a recording surface;
a head stack assembly, including:
a body portion;
an actuator aim cantilevered from the body portion; and
a head gimbal assembly supported at the actuator am and including:
a suspension having a first end and a second end, the first end being attached to the actuator arm;
a slider coupled to the second end of the suspension, the slider comprising a transducer for reading from and writing to the recording surface and
an array of diodes, attached to the suspension, configured to protect the transducer from electrostatic discharge or electrical overstress events and to allow no more than about 6 mA to flow through the transducer; and
a gimbal coupled to the second end of the suspension and to the slider.

47. The disk drive of claim 46, wherein the array of diodes is coupled across the transducer to shunt electrostatic discharges and over currents away from the transducer.

48. The disk drive of claim 46, wherein the array of diodes is configured to shunt electrostatic discharges and over voltages to a voltage potential of the suspension and away from the transducer.

49. The disk drive of claim 46, wherein the array of diodes is configured to shunt electrostatic discharges and over voltages across the transducer to a voltage potential of the suspension.

50. The disk drive of claim 46, wherein the array of diodes is attached near the first end of the suspension.

51. The disk drive of claim 46, wherein the away of diodes is attached to the suspension near the slider.

52. The disk drive of claim 46, wherein the array of diodes is attached between the first and second ends of the suspension.

53. The disk drive of claim 46, wherein the array of diodes is attached to the suspension at a location that minimizes changes to a resonance characteristic of the disk drive.

54. The disk drive of claim 46, wherein the array of diodes includes a diode comprising a Schottky metal barrier.

55. The disk drive of claim 46, wherein the array of diodes includes a Schottky diode-connected transistor.

56. The disk drive of claim 46, wherein the array of diodes includes a GaAs MESFET.

57. The disk drive of claim 46, wherein constituent diodes of the array of diodes have a turn-on voltage that is just above a turn-on voltage of the transducer.

58. The disk drive of claim 57, wherein constituent diodes of the array of diodes have a turn-on voltage that is just above the turn on voltage of the transducer and that is below a turn-on voltage of silicon diodes.

59. The disk drive of claim 57, wherein the turn-on voltage of the constituent diodes of the array of diodes is about 220 mV to about 350 mV.

60. The disk drive of claim 46, wherein the array of diodes is configured to allow no more than about 300 mV from the transducer to the suspension.

* * * * *